(No Model.) 3 Sheets—Sheet 1.
W. R. MONROE.
MACHINE FOR DISTRIBUTING INSECTICIDES.
No. 555,256. Patented Feb. 25, 1896.

WITNESSES:
A. T. Oakley
E. E. Osborne.

INVENTOR,
William R. Monroe,
BY
J. H. Osborne & Co.,
ATTORNEY.

(No Model.) 3 Sheets—Sheet 3.
W. R. MONROE.
MACHINE FOR DISTRIBUTING INSECTICIDES.
No. 555,256. Patented Feb. 25, 1896.
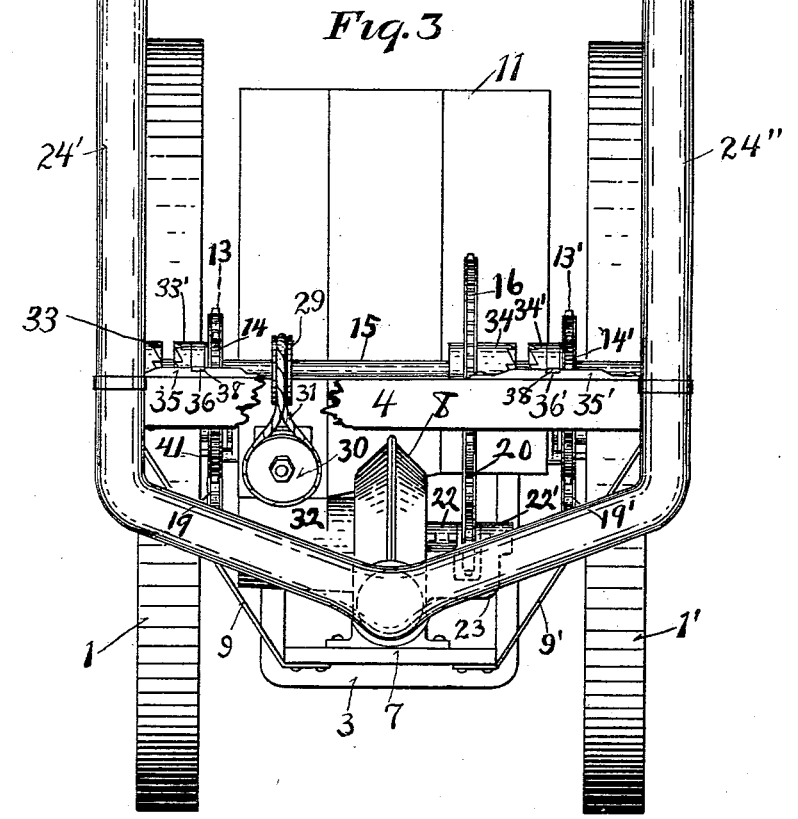
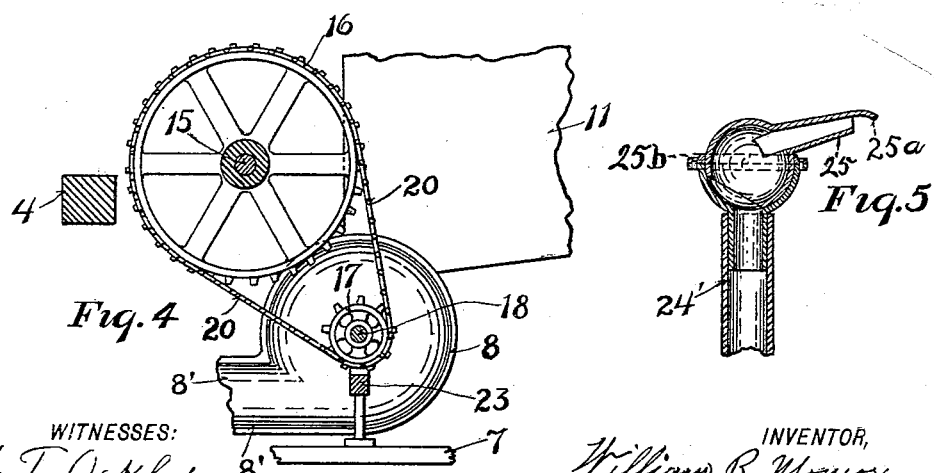
WITNESSES:
A. T. Oakley
E. E. Osborne.
INVENTOR,
William R. Monroe,
BY
J. H. Osborne & Co.,
ATTORNEY.

UNITED STATES PATENT OFFICE.

WILLIAM R. MONROE, OF UNIONVILLE, OHIO.

MACHINE FOR DISTRIBUTING INSECTICIDES.

SPECIFICATION forming part of Letters Patent No. 555,256, dated February 25, 1896.

Application filed February 16, 1895. Serial No. 538,718. (No model.)

*To all whom it may concern:*

Be it known that I, WILLIAM R. MONROE, a citizen of the United States, residing in Unionville, in the county of Lake, State of Ohio, have invented a certain new and useful Machine for Spreading Insecticide and Insectifuge Powders, of which the following, with the accompanying drawings, is a specification.

The object of my invention is a machine that is simple in construction and durable in use, and that is adapted to automatically spread or scatter evenly insect-expelling, insect-exterminating, and fungi-destroying powders over trees, vines, shrubs, plants, flowers, &c., and to distribute other material over a field, and to provide a construction of machine having a narrow tread to travel between rows of grape-vines, &c., with the weight so disposed that it will not tip over when upon rough ground.

My invention consists in the novel features of construction and in the combination of parts described herein and defined in the claims.

Figure 1:
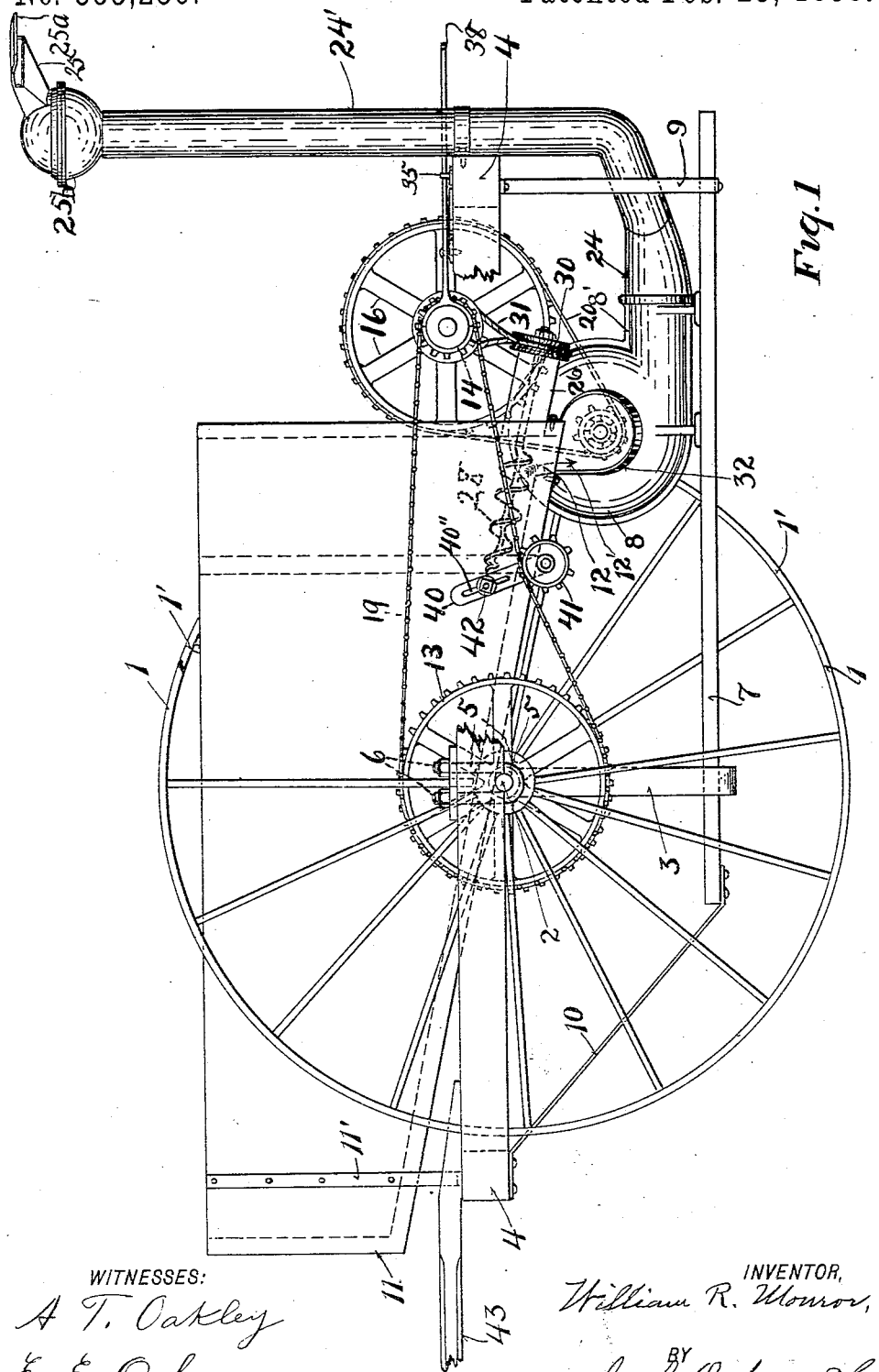
Figure 2:
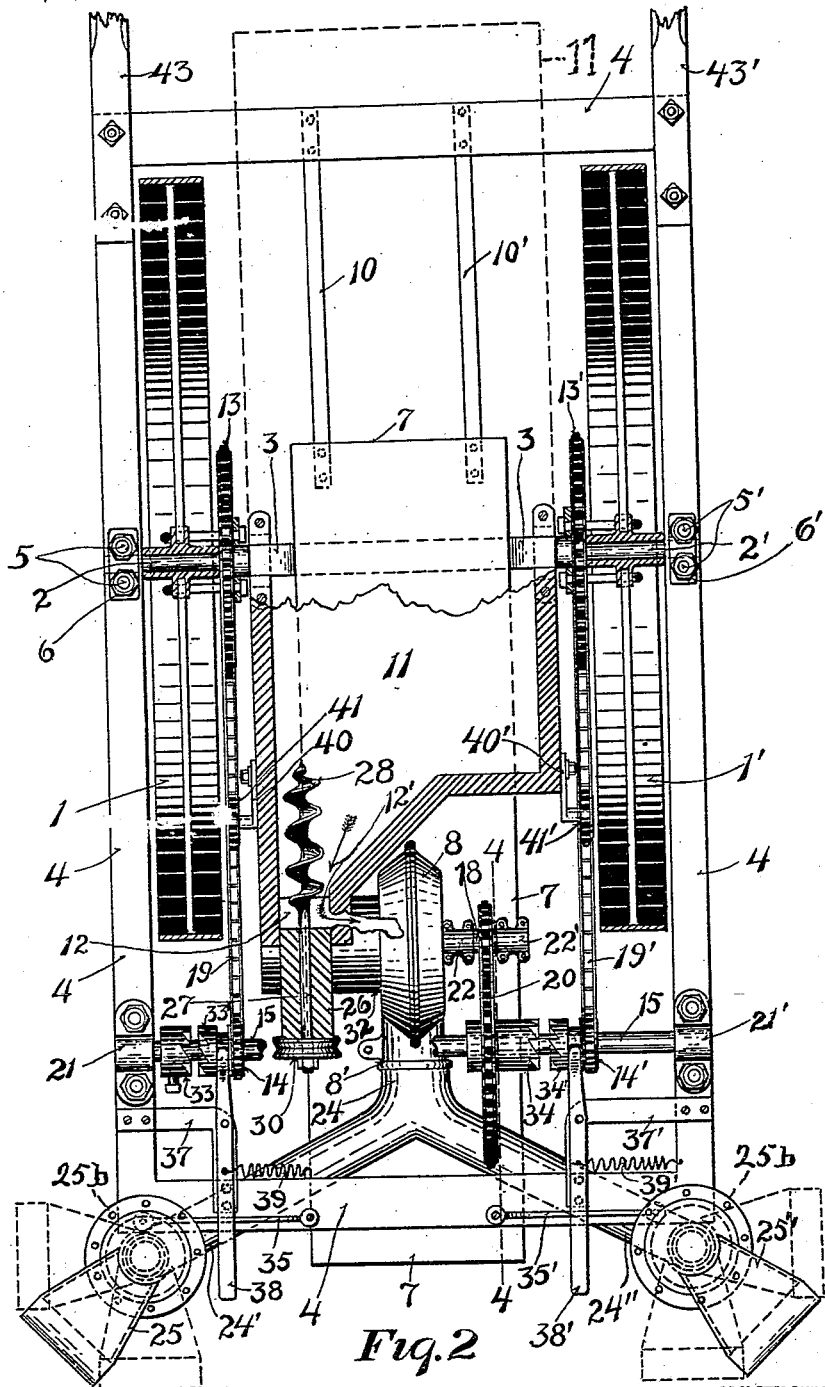

In the drawings, Figure 1 is a side elevation, a part of the truck-frame and the ends of the thills being broken away. Fig. 2 is a plan of the machine, partially in horizontal section on the line of the axles of the traction-wheels. Fig. 3 is a rear end elevation, a part of the truck-frame being broken away. Fig. 4 is a broken section on the line 4 4 of Fig. 2. Fig. 5 is a vertical section of one of the spreaders and a broken section of one of the outlet-pipes.

In all the figures of the drawings like figures of reference refer to like parts.

1 1' are traction-wheels, which are mounted upon the spindles 2 2'. The spindles 2 2' are lateral extensions of the upper ends of the U-shaped axle 3 in the particular embodiment of the invention herein illustrated and described. A rectangular truck-frame 4 is supported and carried outside of the traction-wheels by the outer ends of the spindles 2 2'. The truck-frame 4 is held in position by the U-bolts 5 5', that hook over the ends of the spindles and pass up through the truck-frame. The U-bolts 5 5' are held in place by the nuts 6 6' or by other suitable means.

7 is a platform hung below the axle-spindles, upon which platform stands the rotary blower 8. The platform 7 rests upon the upper side of the lower end of the axle 3, and is supported at its back end from the truck-frame 4 by the braces 9 9'. The front end of the platform 7 is secured by the braces 10 10' to strengthen the truck.

11 is a reservoir in which the powder or other material to be scattered is carried. The reservoir is carried upon the upper ends of the U-axle 3, or is supported by suitable braces 11' or brackets from the truck-frame 4. The bottom of the reservoir slopes or inclines to the back end of the machine, as illustrated, that the powder or material in the reservoir will slide downwardly toward the reservoir-outlet 12.

Upon the platform 7 stands a rotary blower 8, through which the powder or other material in the reservoir 11 is exhausted, as hereinafter described. The rotary fan is of the ordinary construction, having a series of blades or vanes rotating upon a common center inside of a circular casing, the casing having an exhaust-opening 8' extending therefrom tangentially. As this construction of fan is very well known its details of construction are not illustrated in the drawings.

Other forms of exhaust-blowers than that shown may be employed in the embodiment of my invention. Any suitable air-forcing device will answer the purpose.

The rotary fan 8 is driven by suitable multiple gearing from the traction-wheels 1 1'. The intermediate driving mechanism between the traction-wheels and the fan, which I have employed in the within-described embodiment of my invention, consists of the sprocket-wheels 13 13', which by suitable means are made to rotate with the traction-wheels and upon the same axial line; the pinions 14 14', that are loose upon the horizontal shaft 15; the clutch mechanism hereinafter described; the sprocket-wheel 16 fixed upon the horizontal shaft 15, and the pinion 17 fixed upon the fan-shaft 18 with the flat-link chains 19, 19' and 20. The horizontal shaft 15 rotates in boxes 21 21', fixed upon the truck-frame 4, and the fan-shaft 18 rotates in the boxes 22 22' at the top of brackets 23.

Connected with the tangential outlet 8' of the blower 8 is a bifurcated discharge-pipe 24.

At the upper ends of the branches 24' 24'' are spreaders 25 25'. The lower ends of the spreaders are connected with the upper ends of the branches 24' 24'' of the bifurcated discharge-pipe by a ball-and-socket joint 25$^b$, as shown by Fig. 5. The upper side, 25$^a$, of the spreaders projects beyond the lower side and is slightly bent, somewhat of the form shown, and forms a lip for deflecting the powder or material scattered by the machine. The openings through the spreaders are of increasing width and of decreasing height toward their outer ends, as illustrated. This form of spreader discharge-opening with the projecting lip 25$^a$ causes the powder to fly out in a broad thin cloud.

At the back end of the reservoir 11 is a bearing 26, which carries the shaft 27 of the agitator 28. The agitator is in proximity to the discharge-opening 12. The agitator is driven by means of the pulley 29, fixed upon the main horizontal shaft 15, the pulley 30, fixed upon the outer end of the agitator-shaft 27, and the belt 31.

The converging of the back end and one side of the reservoir 11, as illustrated, forms a pocket of the reservoir in which the agitator 28 works. This facilitates the passage of the powder in the reservoir to the discharge-opening 12.

Below the opening 12 there is a passage-way or chute 32 from the reservoir discharge-opening 12 to the blower. The chute shown in the drawing is a piece of sheet metal bent to a cylindrical form and having an opening on its upper side below the reservoir-opening 12. The outer end of the chute 32 is left open to admit air freely to the blower 8. The chute 32, the way through the blower, and the bifurcated pipe 24, with its branches 24' 24'', form a continuous passage from the reservoir 11 to the spreaders 25 25'.

I have provided for throwing the machine in and out of gear by the clutches 33 33' 34 34'. The clutch part 33', made integral with or connected with the pinion 14, and the clutch part 34', made integral with or connected with the pinion 14', are loose upon the shaft 15, and they are capable of turning thereon. One part 33 of one of the clutches is fixed to the shaft 15 and the one part 34 of the opposite clutch is fixed to the sprocket-wheel 16, or is formed upon the hub of said sprocket-wheel, and both said sprocket-wheel 16 and its accompanying part 34 of the adjacent clutch are keyed or otherwise firmly fixed to the shaft 15. Upon the back end of the truck-frame 4 are plates 35 35', having in the upper edge thereof notches 36 36'. Brackets 37 37' are secured to the back corners of the truck-frame 4, upon which brackets are pivoted the clutch-levers 38 38'. When the parts are in the position shown in Fig. 2, with the clutch-levers in the notches 36 36', the machine is "out of gear." When the clutch-levers 38 38' are released from the engaging notches 36 36', the springs 39 39' throw the movable parts 33' 34' into engagement with the fixed parts 33 34 of the clutches and the machine is "in gear," so that the fan and the agitator will be driven as the machine is drawn forward.

Upon the sides of the reservoir 11 are brackets 40 40', carrying idlers 41 41' pivoted thereto, and are adjustable by means of slots 40'' and bolts 42 to adjust the tension of the drive-chains 19 19'.

43 43' are thills to provide for guiding the machine by the horse or animal drawing it.

In operation, the reservoir is filled or partially filled with insecticide-powder or insectifuge-powder, or other powdered material, and the reservoir is closed by means of a cover. (Not shown.) The machine is thrown in gear by releasing the clutch-levers 38 38' from the notches or catches 36 36'. As the machine is drawn forward in gear, the rotary fan is driven at a high speed by the multiple gearing described, and the agitator 28, by reason of its screw form and action, keeps the powder stirred and loose at the reservoir-opening 12, so that the powder will not impact at the lower end of the reservoir, and facilitates the discharge of the powder to the rotary blower. As powder is exhausted from the reservoir, it passes through the opening 12 and the chute 32 to the blower, as indicated by the arrows 12' in Figs. 1 and 2. The powder is blown out through the discharge-pipes 24' 24'' and is caused by the spreaders 25 25' to fly in broad thin clouds, as directed by the spreaders, and to fall upon the vegetation to be treated. As the powder passes out of the spreaders it strikes against the under curved side of the deflector-lips 25$^a$, which causes the powder to be scattered in a desired direction.

The dotted lines in Fig. 2 show the spreaders 25 25' to be adjustable radially and otherwise by means of the ball-and-socket joint 25$^b$, so that the cloud of powder may be directed to fall upon rows of vines, plants, &c., of different distances apart. By changing the lip 25$^a$ to different angles by any known means the direction of the powder may be changed and the thinness of the cloud regulated.

It will be seen that when the machine is in use in gear, when turning at the ends of a field and one of the traction-wheels is backing, the clutch upon that side will turn back without driving the blower. The clutches engage when the machine is drawn forwardly, and they do not engage when the machine is pushed backwardly.

By the construction and combination of truck, truck-frame, axle, and platform upon which the blower rests, the traction-wheels are brought near together, so that they will travel between rows comparatively near together, and the truck-frame with the extended thills serve to prevent vines, shrubs, &c., from coming into contact with the traction-wheels, and at the same time the strain upon the blower from the driving-power is transmitted below the axle-spindles upon which the traction-wheels revolve and prevent the narrow truck from being overbalanced above the axial line of the traction-wheels.

What I claim as my invention, and desire to secure by Letters Patent, is—

1. In a machine for spreading insecticide-powders, a U-shaped axle having lateral extensions for spindles, traction-wheels mounted upon the spindles, a rectangular truck-frame outside the traction-wheels, a platform at the lower bend of the axle, a rotary blower upon the platform, driving connection between the traction-wheels and the rotary blower, a magazine, an agitator within the magazine, a passage from the magazine to the blower, a spreader, and a passage from the blower to the spreader, substantially as described.

2. In a machine for spreading insecticide-powders, traction-wheels, a rotary blower supported below the axes of the traction-wheels, driving connection between the traction-wheels and the blower, a truck-frame inclosing the traction-wheels, a reservoir, an agitator within the reservoir, a passage from the reservoir to the blower, a spreader, and a passage from the blower to the spreader, substantially as described.

3. The combination, in a machine for spreading insecticide and insectifuge powders and other material, of a reservoir having a sloping bottom, a discharge-opening at the lower end of the reservoir, an agitator of the form of a screw in proximity to the discharge-opening within the reservoir, a spreader having a projecting lip, the opening through the spreader being of increasing width and decreasing height toward its outer end, a blower, a passage-way from the discharge-opening through the blower to the spreader, a truck upon which the foregoing devices are mounted, multiple driving connection between the traction-wheels of the truck and the blower, and means for throwing said driving connection in and out of gear, substantially as described.

4. The combination, in a machine for spreading insecticide-powder, of traction-wheels, a rotary blower supported below the axes of the traction-wheels, driving connection between the traction-wheels and the rotary blower, a truck-frame inclosing the traction-wheels, a reservoir having a sloping bottom, a discharge-opening at the lower end of the reservoir, an agitator within the reservoir in proximity to the discharge-opening, a passage-way from the discharge-opening to the blower, a spreader having a projecting lip, the opening through the spreader being of increasing width and of decreasing height toward its outer end, and a passage from the blower-outlet to the spreader, substantially as described.

5. The combination, in a machine for spreading insecticide-powder, of traction-wheels, a rotary blower supported below the axes of the traction-wheels, driving connection between the traction-wheels and the rotary blower, a truck-frame inclosing the traction-wheels, a reservoir between the traction-wheels, a discharge-opening from the reservoir, an agitator within the reservoir in proximity to the discharge-opening, a passage-way from the discharge-opening to the blower, a spreader, and a passage-way between the rotary blower and the spreader, substantially as described.

6. The combination, in a machine for spreading insecticide-powder, of a reservoir having a sloping bottom, a discharge-opening at the lower end of the reservoir, an agitator within the reservoir in proximity to the discharge-opening, a spreader, a rotary blower, a passage-way from the discharge-opening through the blower to the spreader, traction-wheels mounted upon spindles projecting from a U-shaped axle having its bend downward, a truck-frame inclosing the traction-wheels, driving connection between the traction-wheels and the blower, and means for throwing the driving connection in and out of gear, substantially as described.

In testimony whereof I affix my signature, in the presence of two witnesses, this 15th day of February, 1895.

WILLIAM R. MONROE.

Witnesses:
   J. A. OSBORNE,
   A. T. OAKLEY.